United States Patent
Anderson

(10) Patent No.: US 10,604,974 B2
(45) Date of Patent: Mar. 31, 2020

(54) VEHICLE INTERIOR COMPONENT

(71) Applicant: Shanghai Yanfeng Jinqiao Automotive Trim Systems Co. Ltd., Novi, MI (US)

(72) Inventor: Rick Alan Anderson, Grand Haven, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 159 days.

(21) Appl. No.: 15/935,755

(22) Filed: Mar. 26, 2018

(65) Prior Publication Data
US 2018/0274273 A1    Sep. 27, 2018

Related U.S. Application Data

(60) Provisional application No. 62/477,111, filed on Mar. 27, 2017.

(51) Int. Cl.
*E05C 3/16* (2006.01)
*B60R 7/04* (2006.01)
(Continued)

(52) U.S. Cl.
CPC .............. *E05C 3/162* (2013.01); *B60R 7/04* (2013.01); *E05B 17/203* (2013.01); *E05B 83/32* (2013.01);
(Continued)

(58) Field of Classification Search
CPC . E05C 3/162; E05C 3/004; E05C 3/34; B60R 7/04; E05B 17/203; E05B 83/32
See application file for complete search history.

(56) References Cited

U.S. PATENT DOCUMENTS 5,265,450 A    11/1993  Doyle
6,062,623 A     5/2000  Lemmen
(Continued)

FOREIGN PATENT DOCUMENTS

EP    1916132 A1    4/2008
FR     394843       2/1909
(Continued)

OTHER PUBLICATIONS

International Search Report and Written Opinion from the International Searching Authority for International Patent Application No. PCT/US2016/054029 dated Feb. 6, 2017 (in English) (15 pages).

*Primary Examiner* — Jason S Morrow

(57) ABSTRACT

A component for a vehicle interior may comprise a base comprising a bin, a cover configured to move in an opening direction to uncover the bin and a closing direction to cover the bin, and a mechanism to retain the cover to the base. The mechanism may comprise a cam to retain the cover to the base. The cam may rotate to latch the cover to the base and unlatch the cover from the base. The mechanism may comprise an interface to rotate from a raised position to a depressed position to release the cover from the base. The cover may move in the opening direction as the interface rotates from the raised toward the depressed position. The mechanism may comprise a pin. The interface may disengage from the pin to unlatch the cover from the base. The interface may slide against the pin.

20 Claims, 16 Drawing Sheets

(51) Int. Cl.
    *E05C 3/34* (2006.01)
    *E05C 3/00* (2006.01)
    *E05B 83/32* (2014.01)
    *E05B 17/20* (2006.01)
(52) U.S. Cl.
    CPC ............... *E05C 3/00* (2013.01); *E05C 3/004* (2013.01); *E05C 3/34* (2013.01); *E05Y 2900/538* (2013.01)

(56) References Cited

U.S. PATENT DOCUMENTS

| | | | |
|---|---|---|---|
| 6,120,069 | A | 9/2000 | Taranto |
| 7,823,949 | B2 | 11/2010 | VandenHeuvel et al. |
| 8,376,436 | B2 | 2/2013 | Nakamura et al. |
| 8,579,348 | B1 | 11/2013 | Myers |
| 2003/0209956 | A1 | 11/2003 | Bae |
| 2004/0084948 | A1* | 5/2004 | Glynn .................. B60N 2/753 297/411.2 |
| 2011/0309640 | A1 | 12/2011 | Matsubara |
| 2013/0113231 | A1 | 5/2013 | Park et al. |
| 2014/0167435 | A1 | 6/2014 | Sherburn |
| 2015/0337572 | A1 | 11/2015 | Tsalenko et al. |
| 2016/0339848 | A1 | 11/2016 | Hodgson |
| 2016/0340942 | A1 | 11/2016 | Anderson et al. |
| 2017/0050572 | A1 | 2/2017 | Anderson |
| 2018/0086514 | A1* | 3/2018 | Hishida .................. B65D 43/16 |
| 2018/0194295 | A1* | 7/2018 | Jones ........................ B60R 7/04 |
| 2019/0063132 | A1* | 2/2019 | Ike ............................ B60R 7/04 |
| 2019/0136592 | A1* | 5/2019 | Muntean .................. E05B 83/32 |
| 2019/0292819 | A1* | 9/2019 | Minnich .................. E05B 59/00 |

FOREIGN PATENT DOCUMENTS

| | | |
|---|---|---|
| FR | 2817897 A1 | 6/2002 |
| JP | 2006076344 A | 3/2006 |
| WO | 2015120034 A1 | 8/2015 |
| WO | 2015123442 A1 | 8/2015 |
| WO | 2015138751 A1 | 9/2015 |
| WO | 2015179551 A1 | 11/2015 |
| WO | 2017058829 A1 | 4/2017 |

* cited by examiner

VEHICLE INTERIOR COMPONENT

CROSS-REFERENCE TO RELATED APPLICATIONS

The present application claims priority to and incorporates by reference in full the following patent application: (a) U.S. Provisional Patent Application No. 62/477,111 titled "VEHICLE INTERIOR COMPONENT" filed Mar. 27, 2017.

FIELD

The present invention relates to a vehicle interior component. The present invention also relates to a vehicle interior component such as a floor console.

BACKGROUND

It is known to provide a component such as a console for a vehicle interior. It is also known to provide an armrest on the console to facilitate comfort for vehicle occupants. It is further known to provide a storage compartment within the console covered by a cover. It is further known to provide a mechanism to secure the cover to the floor console.

It would be advantageous to provide an improved component with an improved mechanism to facilitate movement of an improved cover between a closed position and an open position.

SUMMARY

The present invention relates to a component for a vehicle interior configured to be operated by application of an external force from an occupant comprising a base comprising a bin, a cover configured to move in an opening direction to uncover the bin and move in a closing direction to cover the bin, and a mechanism configured to retain the cover to the base. The mechanism may comprise a cam configured to retain the cover to the base. The cam may be configured to rotate to (a) latch the cover to the base and (b) unlatch the cover from the base. The mechanism may comprise an arm configured to rotate the cam to latch the cover to the base. The mechanism may comprise an arm and a spring configured to bias the arm to move the cam to latch the cover to the base. The base may comprise at least one of (a) an opening; (b) a recess; (c) a gap; (d) a hole configured to latch the cover to the base. The cam may be configured to engage the at least one of (a) the opening; (b) the recess; (c) the gap; (d) the hole to latch the cover to the base. The mechanism may comprise a spring configured to bias the cam to unlatch the cover from the base. The mechanism may comprise an interface. The cam may be configured to unlatch the cover from the base in response to movement of the interface. The mechanism may comprise an interface configured to rotate from a raised position to a depressed position to unlatch the cover from the base. The mechanism may comprise a spring configured to (a) bias the interface toward the raised position and (b) bias the cam to latch the cover to the base. The cover may comprise at least one of (a) a tambour door; (b) a semi-rigid sheet; (c) a flexible sheet; (d) plastic; (e) cloth, (f) a door.

The present invention also relates to a component for a vehicle interior configured to be operated by application of an external force from an occupant comprising a base comprising a bin, a cover configured to move in an opening direction to uncover the bin and move in a closing direction to cover the bin and a mechanism configured to retain the cover to the base. The mechanism may comprise an interface configured to rotate from a raised position to a depressed position to release the cover from the base. The cover may move in the opening direction as the interface rotates from the raised position toward the depressed position. The mechanism may comprise a pin configured to rotate relative to the base to unlatch the cover from the base in response to rotation of the interface. The mechanism may comprise a spring configured to (a) bias the interface in the raised position and (b) bias the pin to latch the cover to the base. The interface may be configured to rotate from the raised position to the depressed position in response to the external force in the opening direction.

The present invention further relates to a component for a vehicle interior configured to be operated by application of an external force from an occupant comprising a base comprising a bin, a cover configured to move in an opening direction to uncover the bin and move in a closing direction to cover the bin, and a mechanism configured to retain the cover to the base. The mechanism may comprise an interface and a pin. The interface may be configured to disengage from the pin to unlatch the cover from the base. The interface may be configured to slide against the pin. The interface may be configured to rotate in response to the external force to disengage from the pin to unlatch the cover from the base. The mechanism may comprise a spring configured to bias the interface to engage the pin. The mechanism may comprise a spring configured to bias the pin to unlatch the cover from the base.

FIGURES

DESCRIPTION

Referring to FIGS. 1A to 1B and 2A to 2B, a vehicle V is shown according to an exemplary embodiment, including an interior I with instrument panel IP and floor console FC; vehicle also provides seats ST. As shown schematically in FIGS. 1A and 1B according to an exemplary embodiment, floor console FC serves as an armrest as well as a storage compartment. According to an exemplary embodiment, floor console FC may comprise a cover or door shown as a tambour door TD.

Figure 1A:
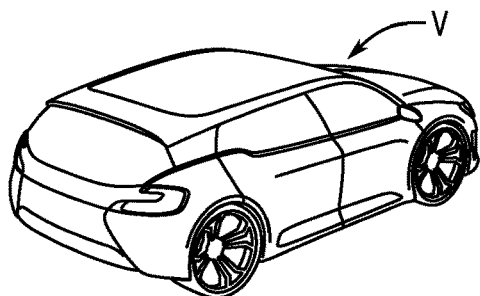
FIG. 1A is a schematic perspective view of a vehicle according to an exemplary embodiment.
Figure 1B:
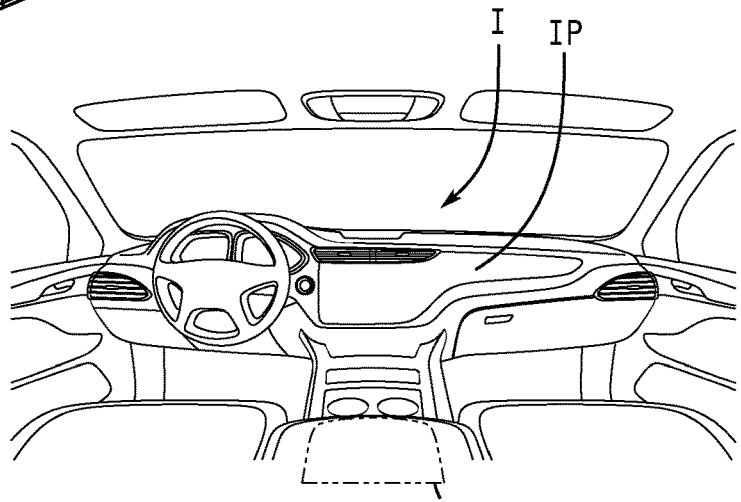
FIG. 1B is a schematic perspective view of an interior of the vehicle according to an exemplary embodiment.
Figure 2A:
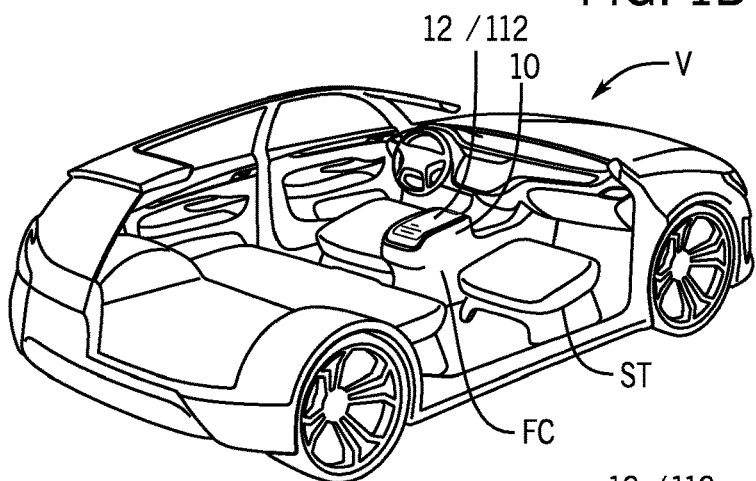
FIGS. 2A and 2B are schematic perspective cut-away views of the vehicle showing the interior according to an exemplary embodiment.
Figure 2B:
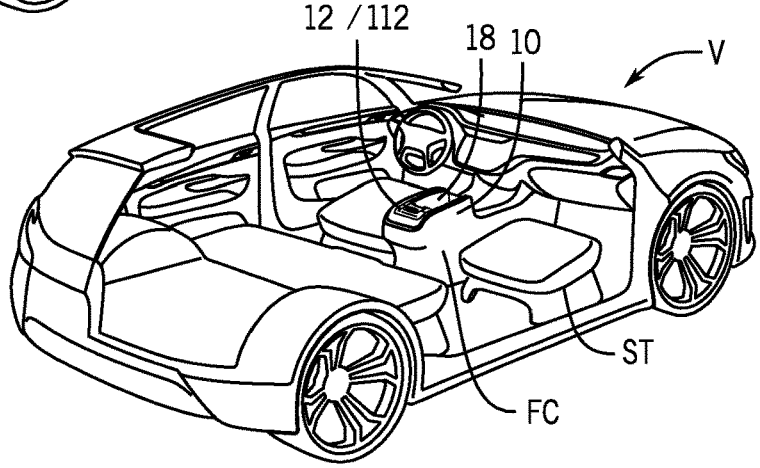

According to an exemplary embodiment as shown schematically in FIGS. 2A and 2B, a vehicle interior component 10 (such as floor console FC, console, overhead console, storage compartment, etc.) may provide a cover or door 12/112 shown as a tambour door 12/112 and a base comprising an interior storage compartment or bin 18; cover 12/112 facilitates access to the bin 18 and may be configured to move in both an opening direction to uncover bin 18 and a closing direction to cover the bin 18. As shown in FIGS. 2A and 2B according to an exemplary embodiment, cover 12/112 may be configured to move between a closed position (shown in FIG. 2A) and an open position (shown in FIG. 2B); cover 12/112 may be supported (e.g. by at least one side rail 14 shown in FIG. 10A) at the closed position and at least partially concealed from view (e.g. by the base) at the open position. According to an exemplary embodiment, cover 12/112 may comprise at least one of (a) a tambour door; (b) a semi-rigid sheet; (c) a flexible sheet; (d) plastic; (e) cloth, (f) a door.

Figure 3A:
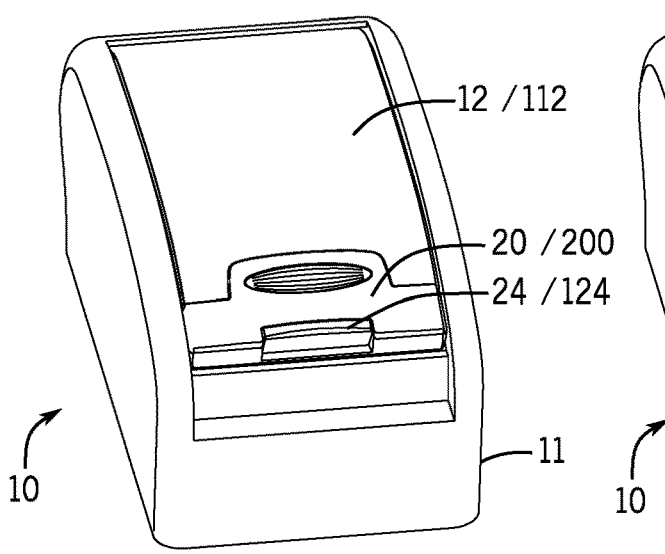
FIG. 3A is a schematic perspective view of a component for the vehicle interior with a cover in a closed position according to an exemplary embodiment.
Figure 3B:
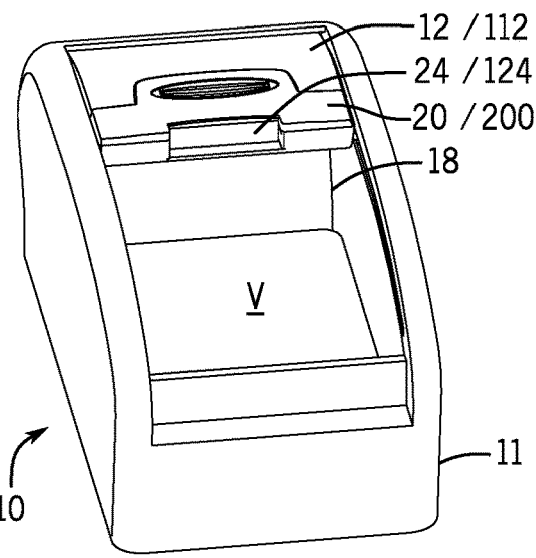
FIG. 3B is a schematic perspective view of a component for the vehicle interior with a cover in an open position according to an exemplary embodiment.

As shown schematically in FIG. 3A, component 10 may comprise a base 11 and cover 12/112. As shown schematically in FIG. 3A, cover 12/112 is at the closed position; as shown schematically in FIG. 3B, cover 12/112 is at the open position. As shown schematically in FIGS. 3A and 3B, cover 12/112 may provide a mechanism 20/200 and an interface 24/124; base 11 may comprise bin 18 and a rail 14. According to an exemplary embodiment, cover 12/112 may be configured to cover bin 18 when cover 12/112 is at the closed position; bin 18 is exposed and accessible when cover 12/112 is at the open position. Interface 24/124 may comprise at least one of a button, a lever, a handle, a control, a switch, a release.

Figure 4A:
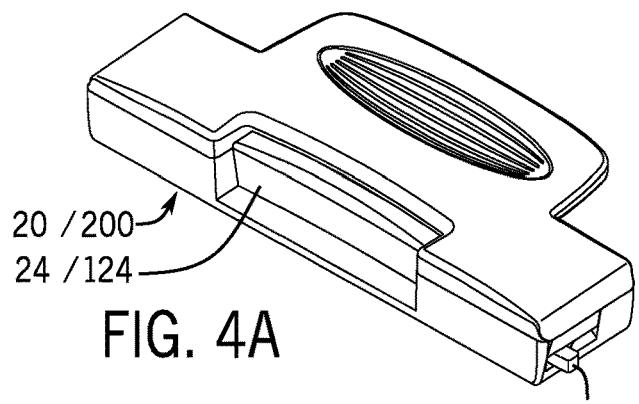
FIGS. 4A to 4C are schematic perspective views of a mechanism for the component according to an exemplary embodiment.
Figure 4B:
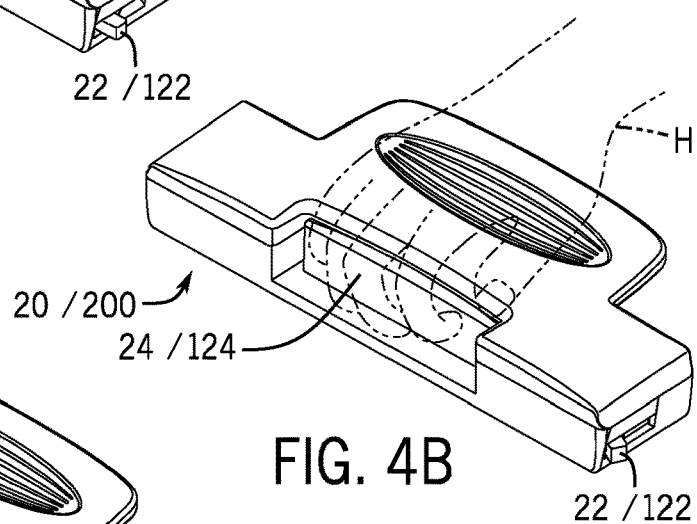
Figure 4C:
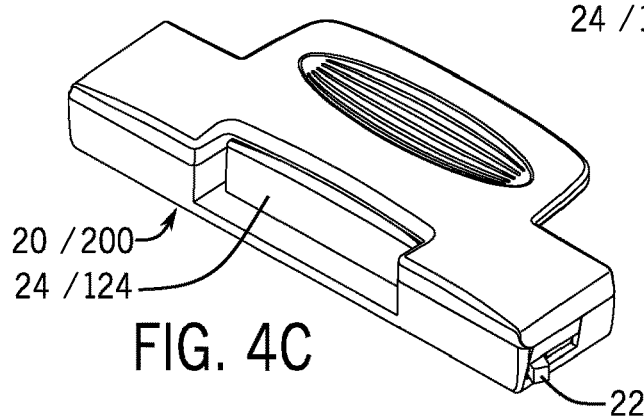

As shown schematically in FIGS. 4A to 4C, mechanism 20/200 may provide an interface, handle or button 24/124 and pin or cam 22/122; interface 24/124 may be configured to move (e.g. actuate, depress, rotate) between a raised/default position (shown in FIG. 4A) and a depressed/rotated position (shown in FIGS. 4B and 4C) to unlatch cover 12/112 from base 11; pin or cam 22/122 may be configured to move between an engaged position to latch cover 12/112 to base 11 and a rotated or released position (e.g. as actuated at interface 24/124). According to an exemplary embodiment, when interface 24/124 is in the raised/default position, pin or cam 22/122 may be in the engaged position with pin or cam 22/122 being engaged with an opening, aperture or gap along rail 14; when interface 24/124 is in the depressed/rotated position, pin or cam 22/122 may rotate out of the engaged position and disengage from the opening, aperture or gap.

According to an exemplary embodiment as shown schematically in FIGS. 5A-5E, mechanism 200 may comprise a cam or pin 122 configured to retain cover 112 to base 11. See e.g. FIGS. 6A and 8E. Cam or pin 122 may be configured to rotate to latch cover 112 to base 11 as shown schematically in FIGS. 5B and 5D and unlatch cover 112 from base 11 as shown schematically in FIGS. 5C and 5E. See e.g. FIGS. 8C-8E. Mechanism 200 may comprise an arm 126 configured to rotate cam or pin 122 to latch cover 112 to base 11. See e.g. FIGS. 8C-8E. Mechanism 200 may comprise arm 126 and a spring 128 configured to bias arm 126 to move cam or pin 122 to latch cover 112 to base 11. See e.g. FIGS. 8C-8E. Cam or pin 122 may be configured to engage at least one of (a) an opening; (b) a recess; (c) a gap; (d) a hole of base 11 to latch cover 112 to base 11. See e.g. FIGS. 6A, 8D and 8E. Mechanism 200 may comprise a spring 123 configured to bias cam or pin 122 to unlatch cover 112 from base 11. See e.g. FIGS. 7A-7D. Mechanism 200 may comprise an interface 124. Cam or pin 122 may be configured to unlatch cover 112 from base 11 in response to movement of interface 124. See e.g. FIGS. 6B-6D. Interface 124 may be configured to rotate from a raised position as shown schematically in FIGS. 5B and 5D to a depressed position as shown schematically in FIGS. 5C and 5E about a pivot 124a to unlatch cover 112 from base 11. See e.g. FIGS. 6A-6D and 7A-7D. Spring 128 may be configured to bias interface 124 toward the raised position and bias cam or pin 122 to latch cover 112 to base 11. See e.g. FIGS. 6A and 7A. Mechanism 200 may comprise an upper housing 132 and a lower housing 130. Lower housing 130 may comprise a feature 130a configured for rotation of interface 124 about pivot 124a. See e.g. FIGS. 7A-7D. Cam or pin 122 may comprise a set of cams or pins 122. Arm 126 may comprise a set of arms 126. See e.g. FIGS. 6A-6E and 8A-8E. Pivot 124a may comprise a set of pivots 124a. Feature 130a may comprise a set of features 130a.

Figure 5A:
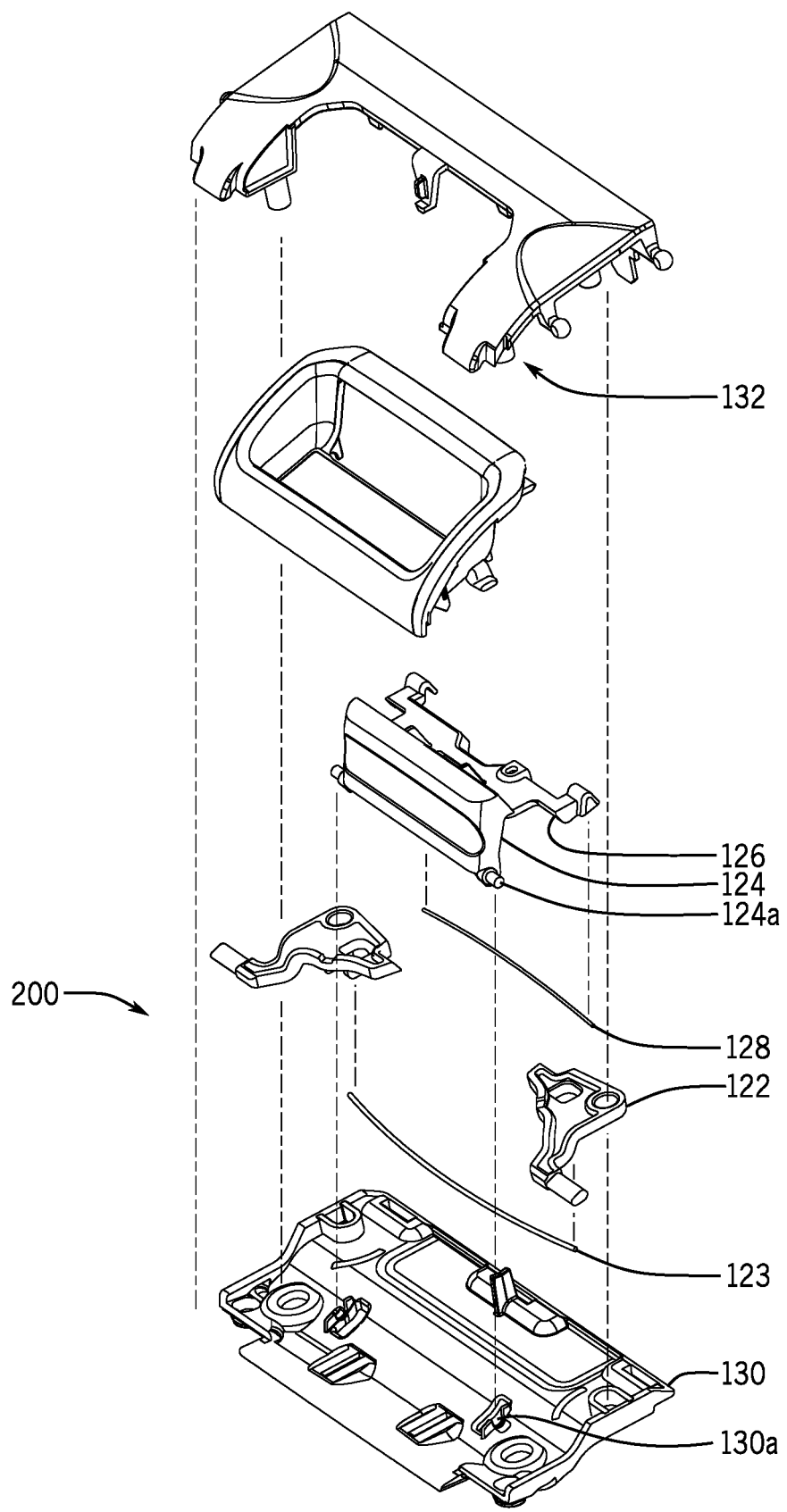
FIG. 5A is a schematic exploded view of a mechanism for the component according to an exemplary embodiment.
Figure 5B:
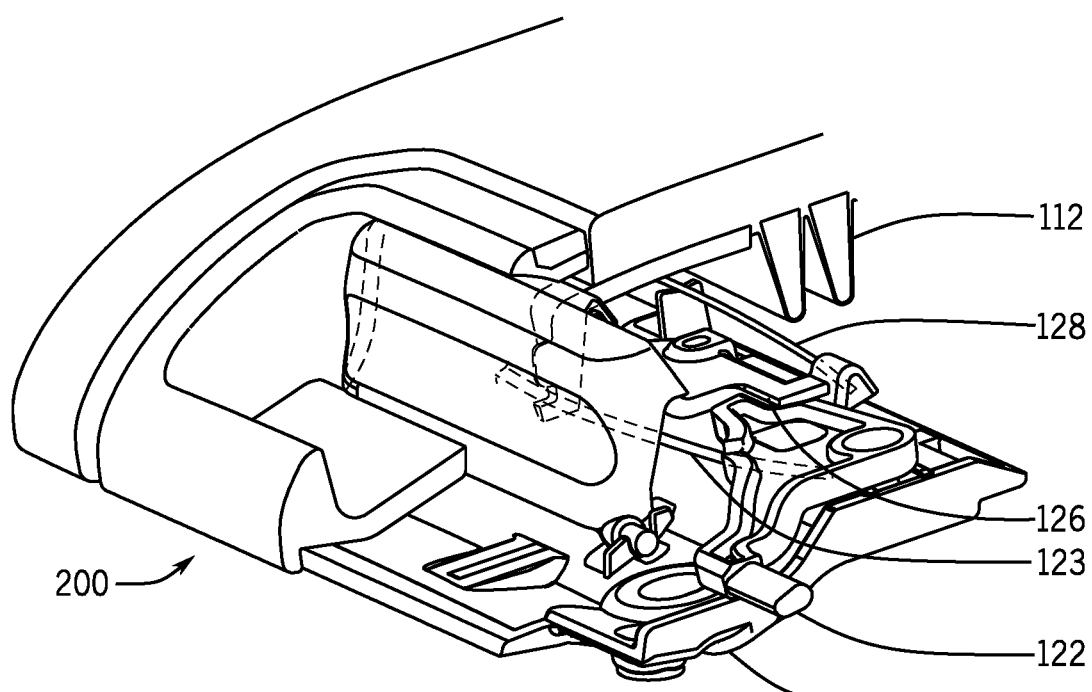
FIGS. 5B-5E are schematic partial perspective views of a mechanism for the component according to an exemplary embodiment.
Figure 5C:
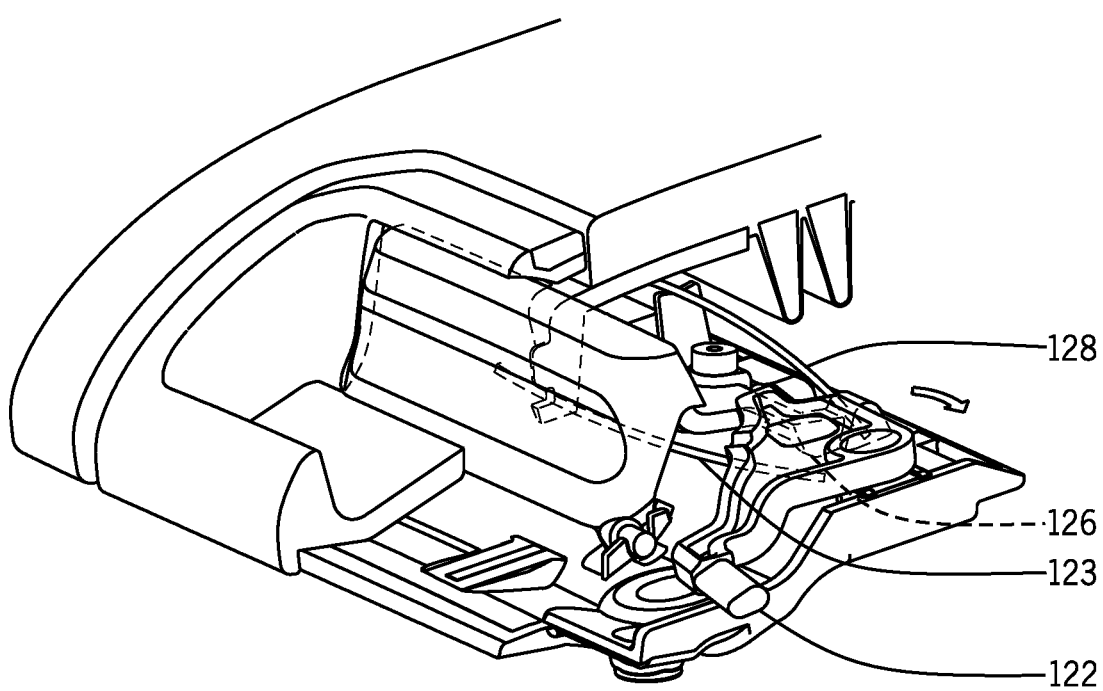
Figure 5D:
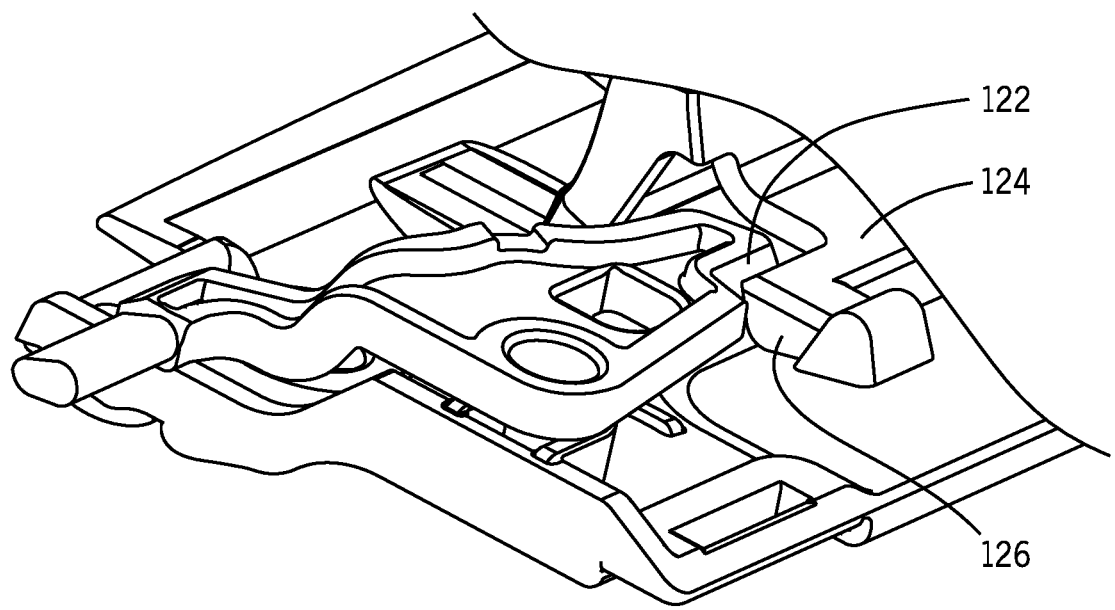
Figure 5E:
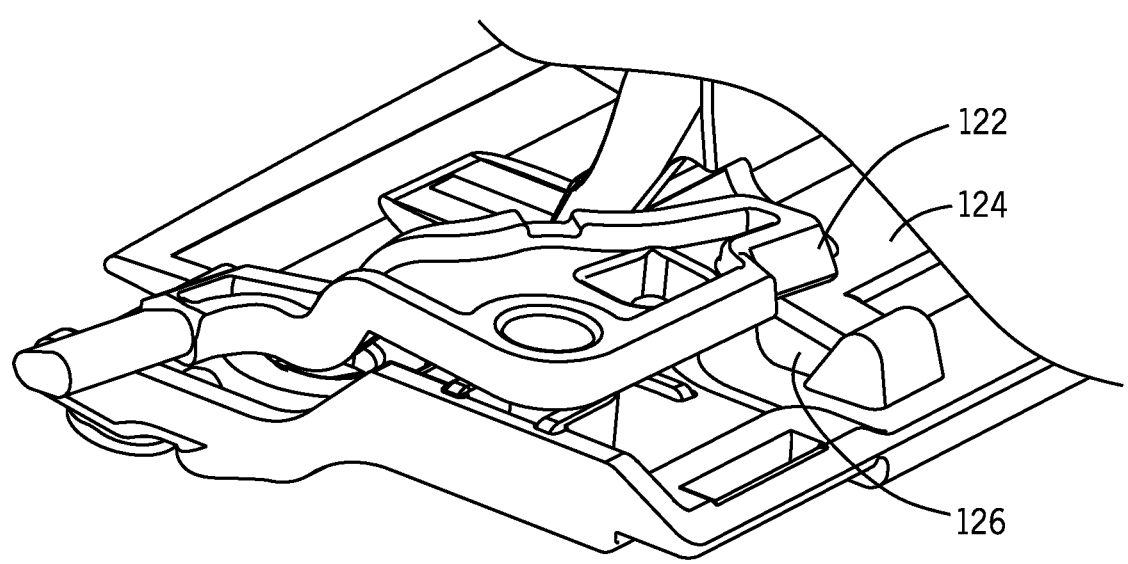

According to an exemplary embodiment as shown schematically in FIGS. 5A-5E, interface 124 may be configured to rotate from a raised position as shown schematically in FIGS. 5B and 5D to a depressed position as shown schematically in FIGS. 5C and 5E to release cover 112 from base 11. Cover 112 may move in the opening direction as interface 124 rotates from the raised position toward the depressed position. Cam or pin 122 may be configured to rotate relative to base 11 to unlatch cover 112 from base 11 in response to rotation of interface 124. Spring 128 may be configured to bias interface 124 in the raised position and bias cam or pin 122 to latch cover 112 to base 11. Interface 124 may be configured to rotate from the raised position to the depressed position in response to an external force in the opening direction. Cam or pin 122 may comprise a set of cams or pins 122. Arm 126 may comprise a set of arms 126. See e.g. FIGS. 6A-6E and 8A-8E.

According to an exemplary embodiment as shown schematically in FIGS. 5A-5E, interface 124 may be configured to disengage from cam or pin 122 to unlatch cover 112 from base 11. Interface 124 may be configured to slide against cam or pin 122; interface 124 may be configured to rotate in response to an external force to disengage from cam or pin 122 to unlatch cover 112 from base 11. Spring 128 may be configured to bias interface 124 to engage cam or pin 122. Spring 123 may be configured to bias cam or pin 122 to unlatch cover 112 from base 11. Cam or pin 122 may comprise a set of cams or pins 122. Arm 126 may comprise a set of arms 126.

Figure 6A:
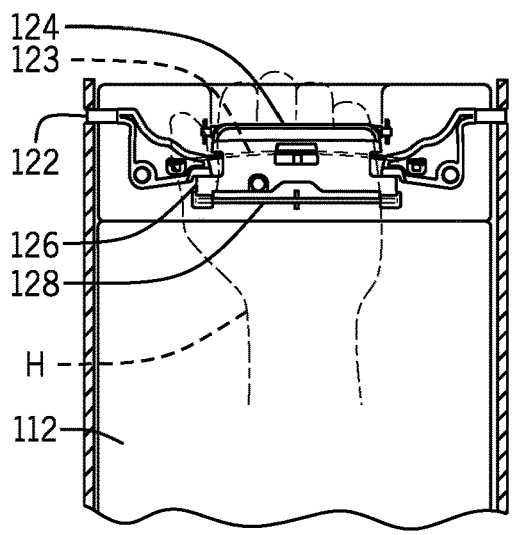
FIGS. 6A to 6E are schematic top partial views of the component with a cover moving from the closed position to the open position according to an exemplary embodiment.
Figure 6B:
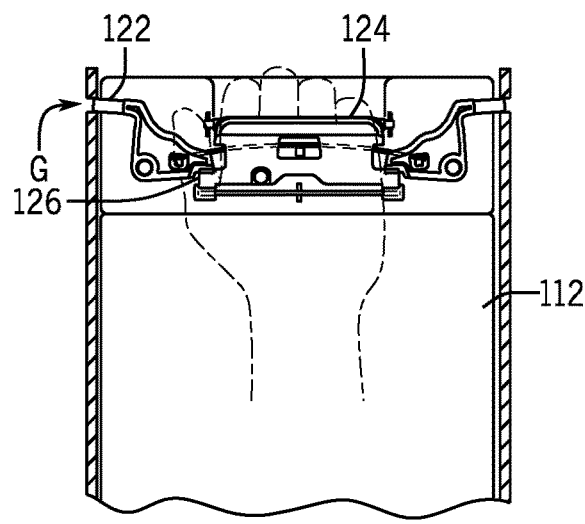
Figure 6C:
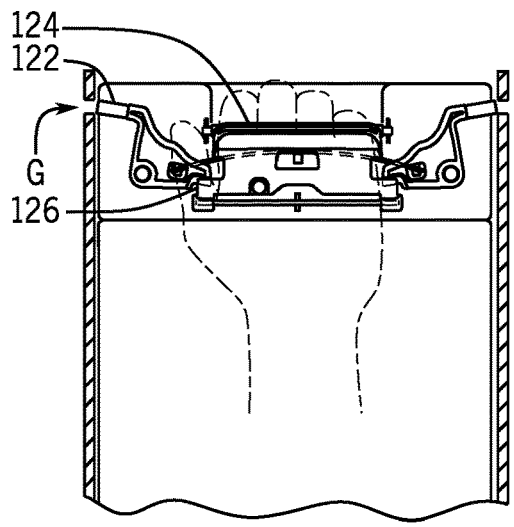
Figure 6D:
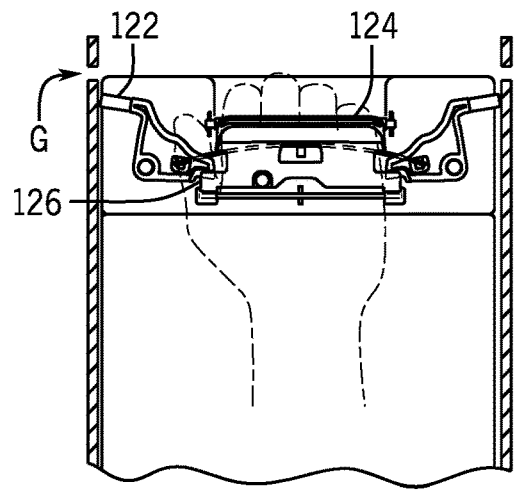
Figure 6E:
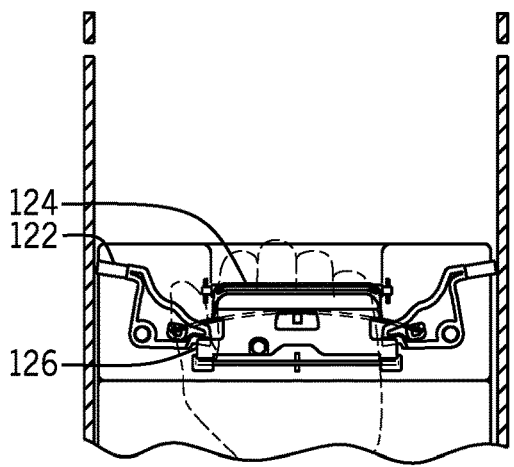

According to an exemplary embodiment as shown schematically in FIG. 6A, cam or pin 122 may be configured to retain cover 112 to base 11. Cam or pin 122 may be configured to rotate to unlatch cover 112 from base 11 as shown schematically in FIGS. 6B-6D. Arm 126 and spring 128 may be configured to bias arm 126 to move cam or pin 122 to latch cover 112 to base 11 as shown schematically in FIG. 6A. Cam or pin 122 may be configured to engage at least one of (a) an opening; (b) a recess; (c) a gap; (d) a hole G of base 11 to latch cover 112 to base 11 as shown schematically in FIG. 6A. Cam or pin 122 may be configured to unlatch cover 112 from base 11 in response to movement of interface 124 as shown schematically in FIGS. 6B-6D. Interface 124 may be configured to rotate from a raised position as shown schematically in FIG. 6A to a depressed position as shown schematically in FIGS. 6C and 6D to unlatch cover 112 from base 11. Spring 128 may be configured to bias interface 124 toward the raised position and bias cam or pin 122 to latch cover 112 to base 11 as shown schematically in FIG. 6A. Interface 124 may be configured to rotate from a raised position as shown schematically in FIG. 6A to a depressed position as shown schematically in FIGS. 6C and 6D to release cover 112 from base 11. Cover 112 may move in the opening direction as interface 124 rotates from the raised position toward the depressed position. Cam or pin 122 may be configured to rotate relative to base 11 to unlatch cover 112 from base 11 in response to rotation of interface 124 as shown schematically in FIGS. 6B and 6C. Spring 128 may be configured to bias interface 124 in the raised position and bias cam or pin 122 to latch cover 112 to base 11 as shown schematically in FIG. 6A. Interface 124 may be configured to rotate from the raised position to the depressed position in response to an external force in the opening direction as shown schematically in FIGS. 6B and 6C.

Figure 7A:
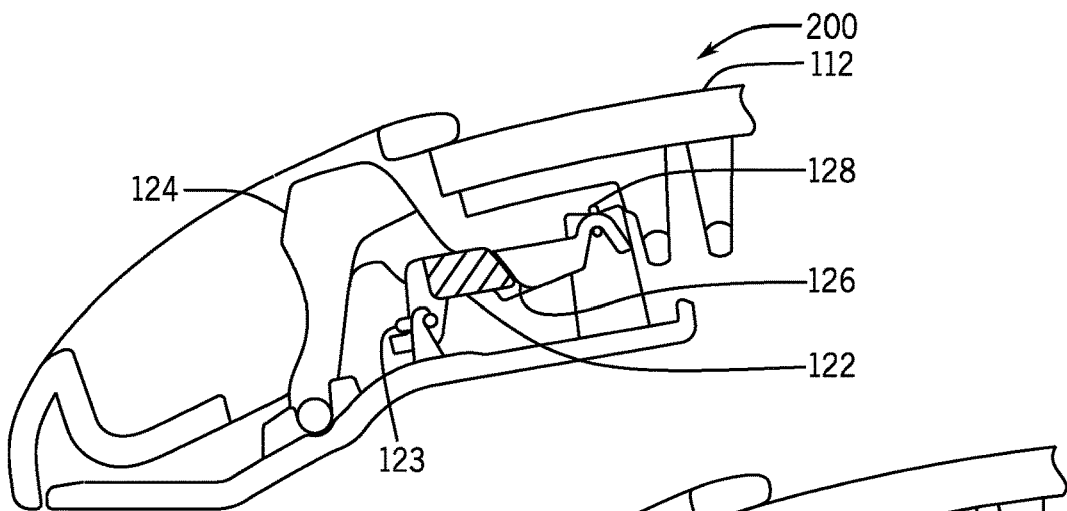
FIGS. 7A to 7D are schematic partial section views of the component with a mechanism moving from a latched position to an unlatched position according to an exemplary embodiment.
Figure 7B:
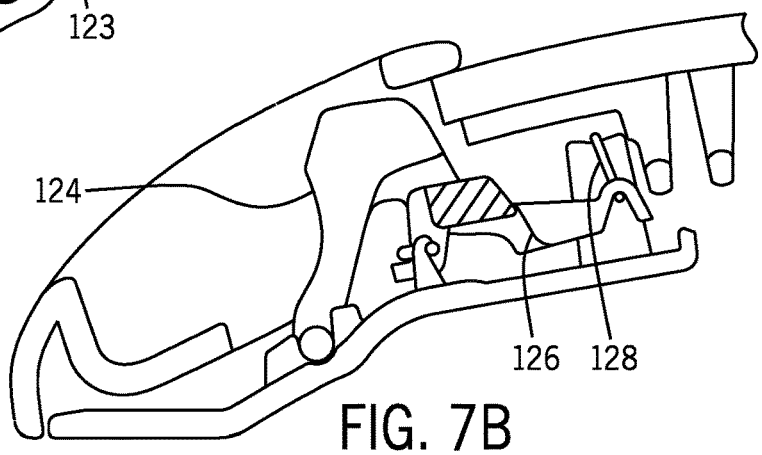
Figure 7C:
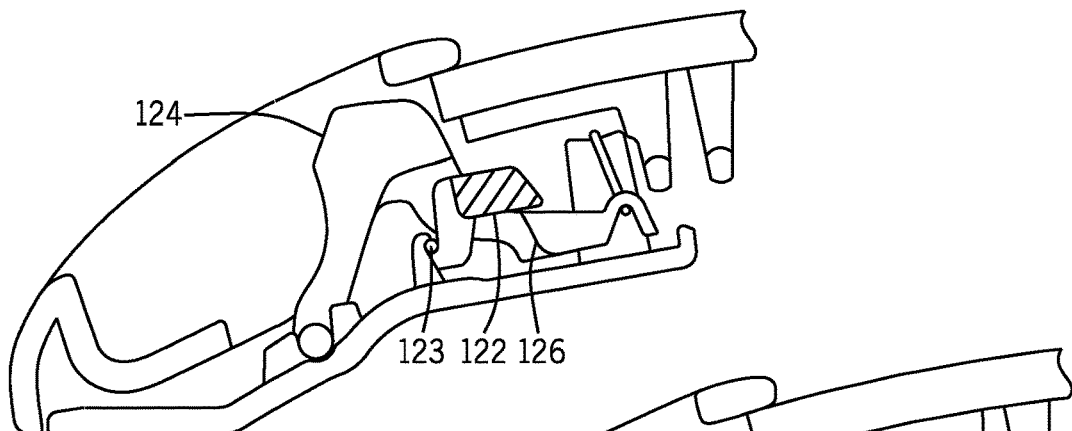
Figure 7D:
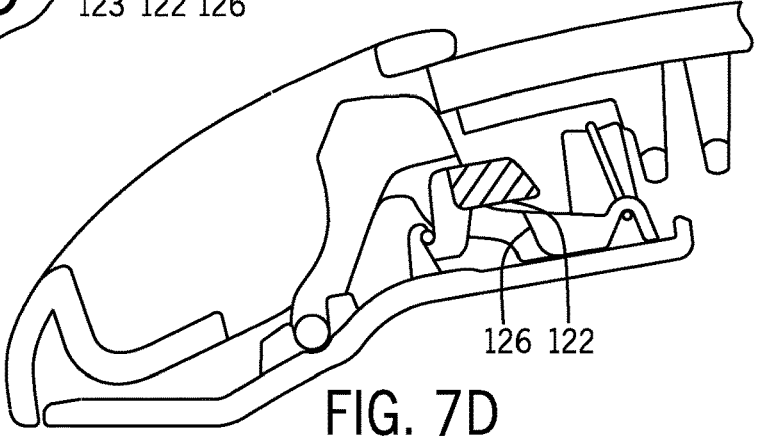
Figure 8A:
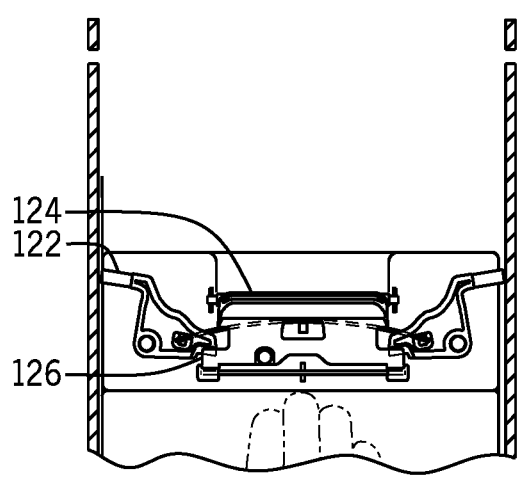
FIGS. 8A to 8E are schematic top partial views of the component with a cover moving from the open position to the closed position according to an exemplary embodiment.
Figure 8B:
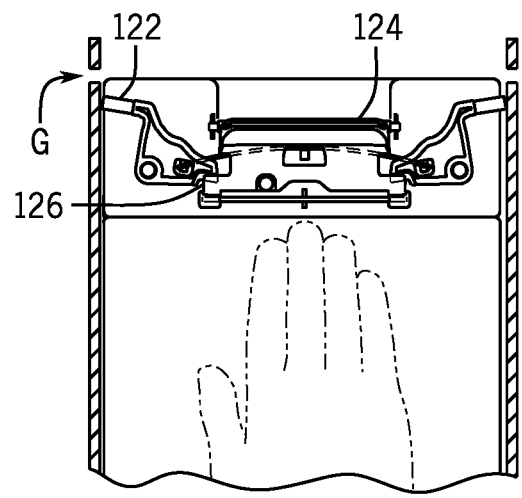
Figure 8C:
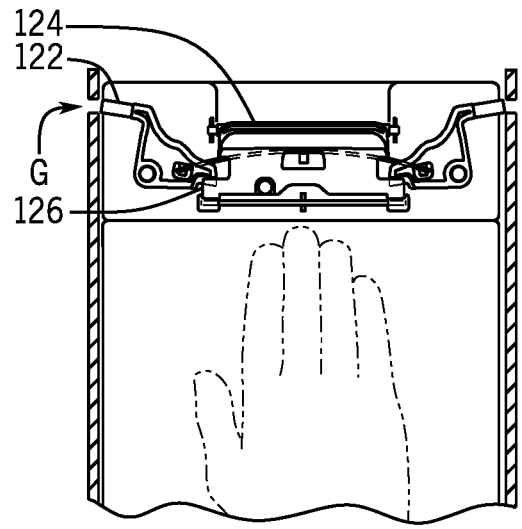
Figure 8D:
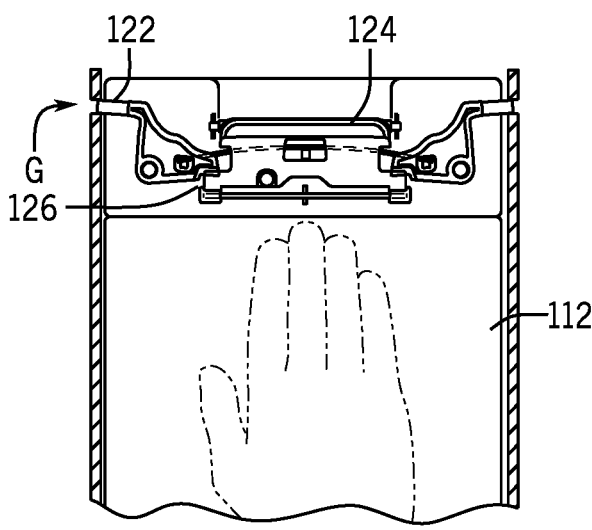
Figure 8E:
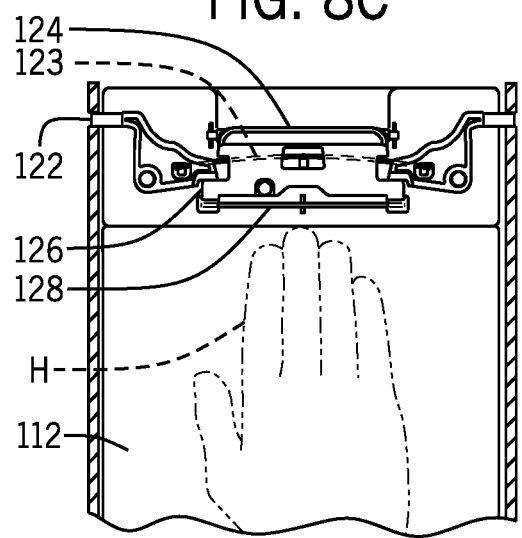

According to an exemplary embodiment as shown schematically in FIGS. 7A-7D, cam or pin 122 may be configured to rotate to unlatch cover 112 from base 11. Spring 123 may be configured to bias cam or pin 122 to unlatch cover 112 from base 11. Cam or pin 122 may be configured to unlatch cover 112 from base 11 in response to movement of interface 124. Interface 124 may be configured to rotate from a raised position as shown in FIG. 7A to a depressed position as shown in FIG. 7C to unlatch cover 112 from base 11. Spring 128 may be configured to bias interface 124 toward the raised position and bias cam or pin 122 to latch cover 112 to base 11 as shown schematically in FIG. 7A. Cover 112 may move in the opening direction as interface 124 rotates from the raised position toward the depressed position. Cam or pin 122 may be configured to rotate relative to base 11 to unlatch cover 112 from base 11 in response to rotation of interface 124. Spring 128 may be configured to bias interface 124 in the raised position and bias cam or pin 122 to latch cover 112 to base 11. The interface may be configured to rotate from the raised position to the depressed position in response to an external force in the opening direction. Interface 124 may be configured to disengage from cam or pin 122 as shown schematically in FIG. 7D to unlatch cover 112 from base 11; interface 124 may be configured to slide against cam or pin 122 as shown schematically in FIGS. 7A to 7C. Spring 123 may be configured to bias cam or pin 122 to unlatch cover 112 from base 11.

According to an exemplary embodiment as shown schematically in FIGS. 8A-8E, cam or pin 122 may be configured to rotate to latch cover 112 to base 11. Arm 126 may be configured to rotate cam or pin 122 to latch cover 112 to base 11 as shown schematically in FIGS. 8C to 8E. Arm 126 and spring 128 may be configured to bias arm 126 to move cam or pin 122 to latch cover 112 to base 11. Cam or pin 122 may be configured to engage at least one of (a) an opening; (b) a recess; (c) a gap; (d) a hole of base 11 to latch cover 112 to base 11 as shown schematically in FIGS. 8D and 8E. Interface 124 may be configured to rotate from a depressed position as shown schematically in FIGS. 8A to 8C to a raised position as shown schematically in FIG. 8E to latch cover 112 to base 11. Spring 128 may be configured to bias interface 124 toward the raised position and bias cam or pin 122 to latch cover 112 to base 11.

Figure 9:
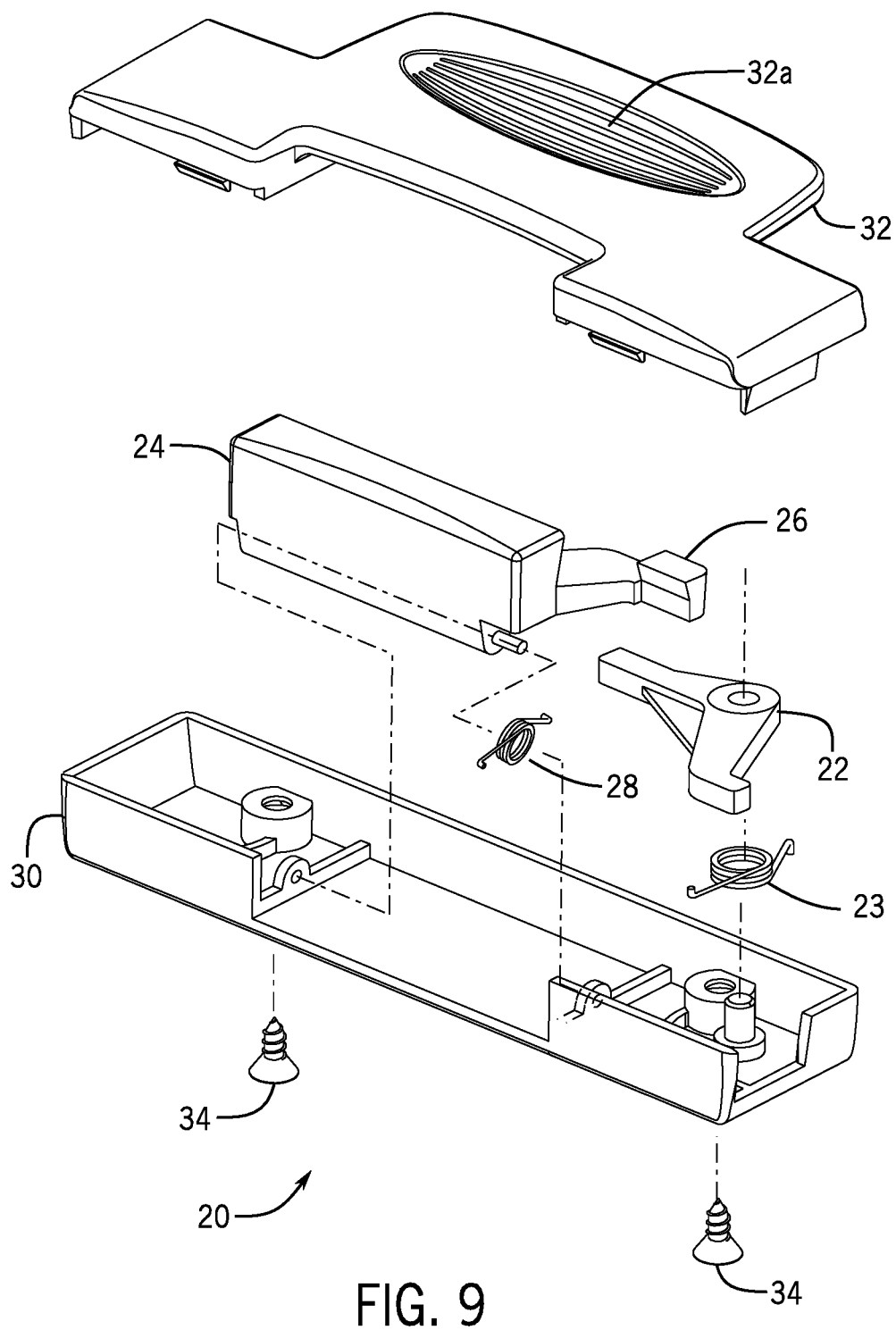
FIG. 9 is a schematic exploded view of a mechanism for the component according to an exemplary embodiment.

According to an exemplary embodiment as shown schematically in FIG. 9, mechanism 20 may comprise a cam or pin 22 configured to retain cover 12 to base 11. Cam or pin 22 may be configured to rotate to latch cover 12 to base 11 as shown in FIGS. 10A, 11A, 12A, 13E, 14F, 15A and 16A and unlatch cover 12 from base 11 as shown schematically in FIGS. 10B-10C, 11B-11D and 15B-15C. Mechanism 20 may comprise an arm 26 configured to rotate cam or pin 22 to latch cover 12 to base 11. Mechanism 20 may comprise arm 26 and a spring 28 configured to bias arm 26 to move cam or pin 22 to latch cover 12 to base 11. Cam or pin 22 may be configured to engage at least one of (a) an opening; (b) a recess; (c) a gap; (d) a hole of base 11 to latch cover 12 to base 11. Mechanism 20 may comprise a spring 23 configured to bias cam or pin 22 to unlatch cover 12 from base 11. Mechanism 20 may comprise an interface 24. Cam or pin 22 may be configured to unlatch cover 12 from base 11 in response to movement of interface 24. Interface 24 may be configured to rotate from a raised position as shown schematically in FIGS. 10A, 11A, 12A, 14F and 15A to a depressed position as shown schematically in FIGS. 10C-10E, 11C-11D, 12C-12F, 13A-13B, 14A-14D, 15C-15E and 16C-16E to unlatch cover 12 from base 11. Spring 28 may be configured to bias interface 24 toward the raised position and bias cam or pin 22 to latch cover 12 to base 11. Mechanism 20 may comprise an upper housing 32 and a lower housing 30; mechanism 20 may comprise fasteners 34. Upper housing 32 may comprise a handle or depression 32*a*.

Figure 11A:
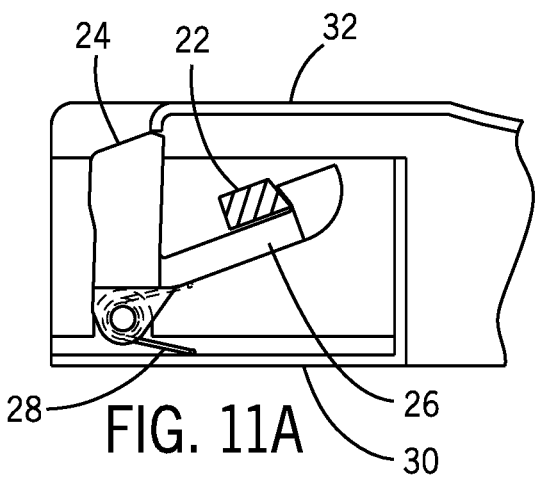
FIGS. 11A to 11D are schematic partial section views of a mechanism for the component moving from a latched position to an unlatched position according to an exemplary embodiment.
Figure 11B:
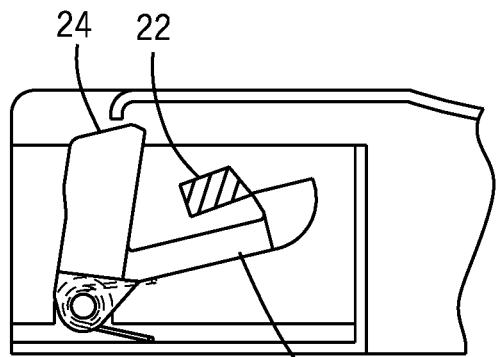
Figure 11C:
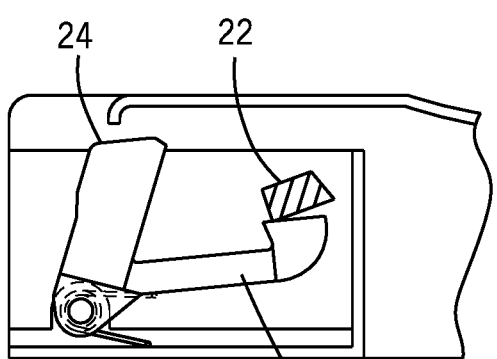
Figure 11D:
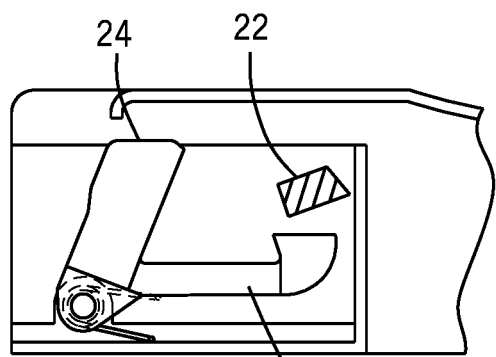
Figure 12A:
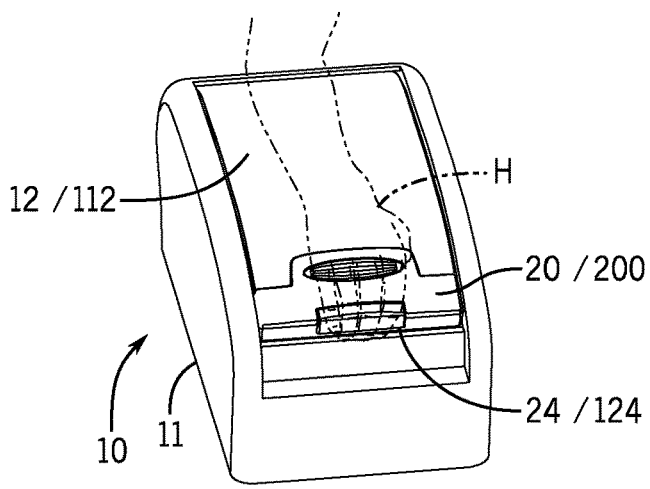
FIGS. 12A to 12F are schematic perspective views of the component with a cover moving from the closed position to the open position according to an exemplary embodiment.
Figure 12B:
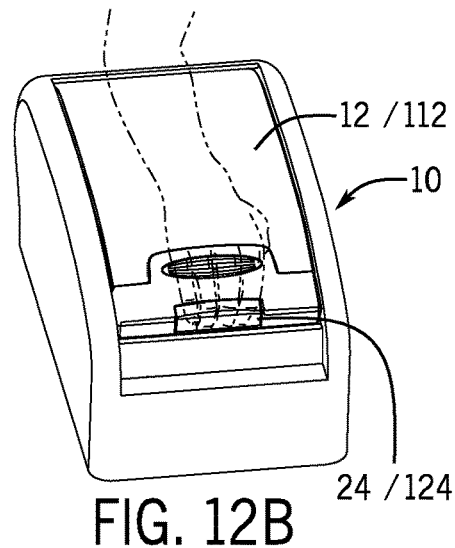
Figure 12C:
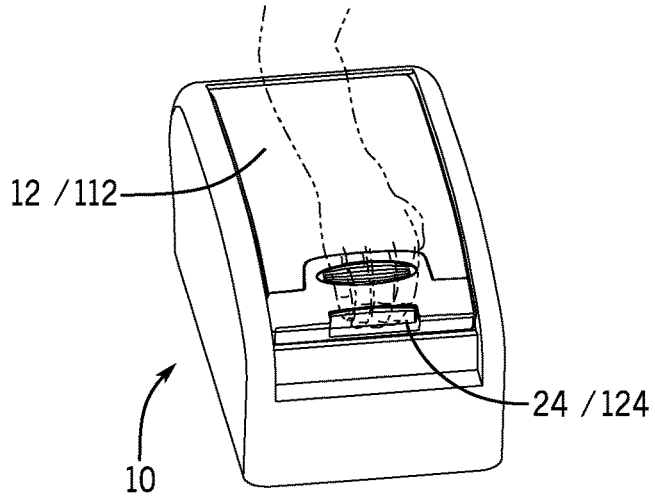
Figure 12D:
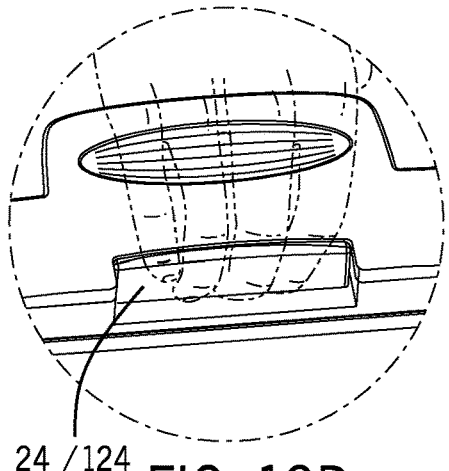
Figure 12E:
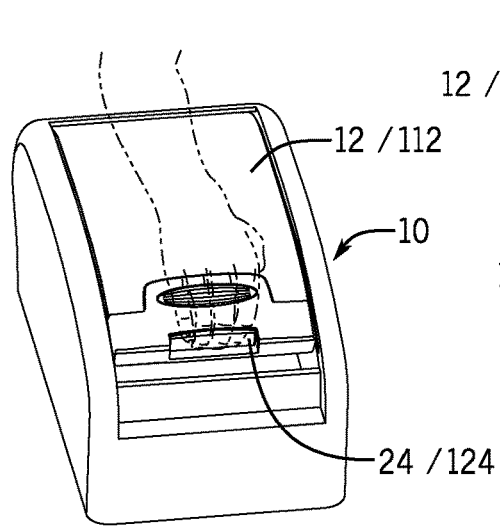
Figure 12F:
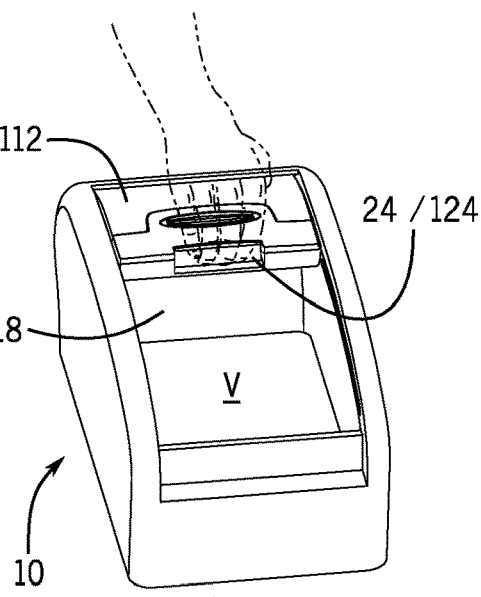
Figure 13A:
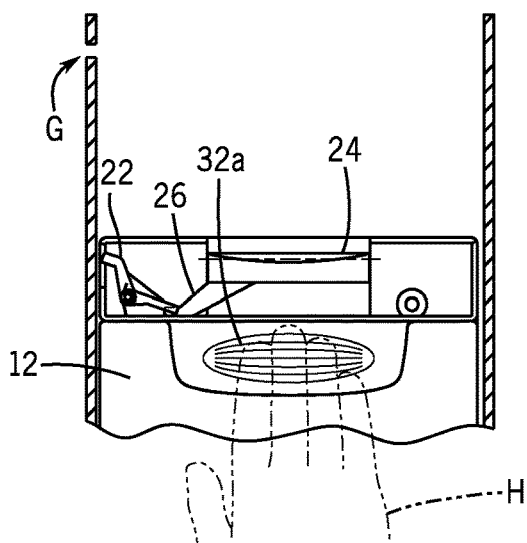
FIGS. 13A to 13E are schematic top partial views of the component with a cover moving from the open position to the closed position according to an exemplary embodiment.
Figure 13B:
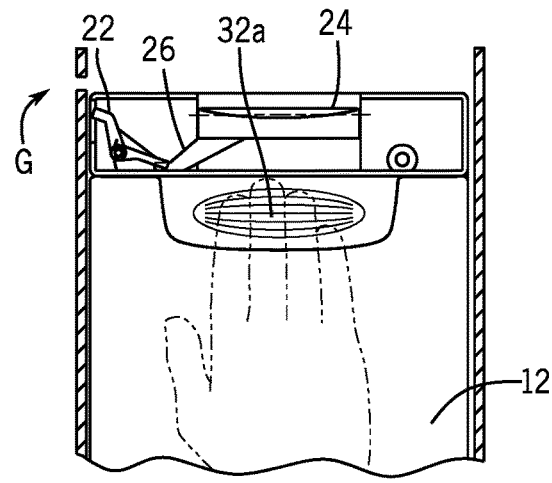
Figure 13C:
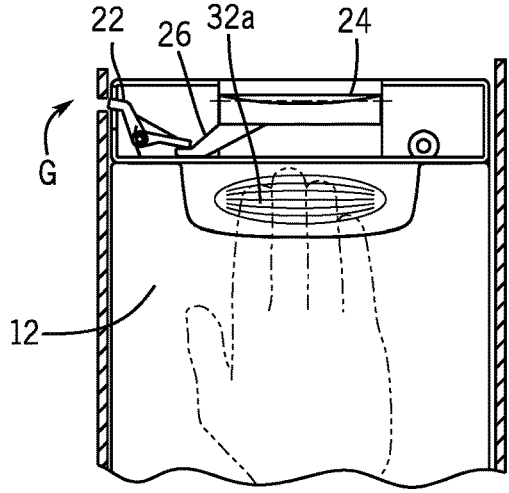
Figure 13D:
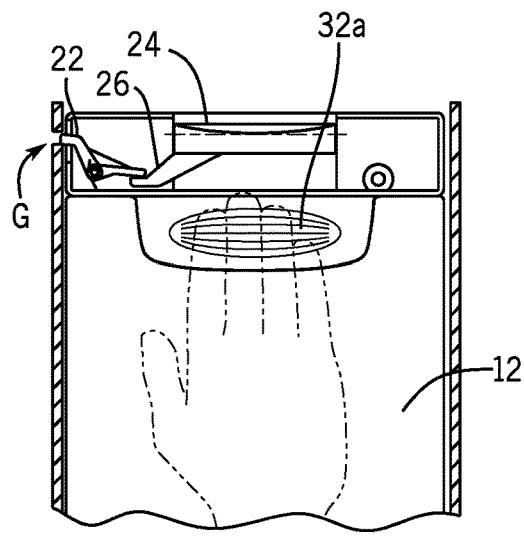
Figure 13E:
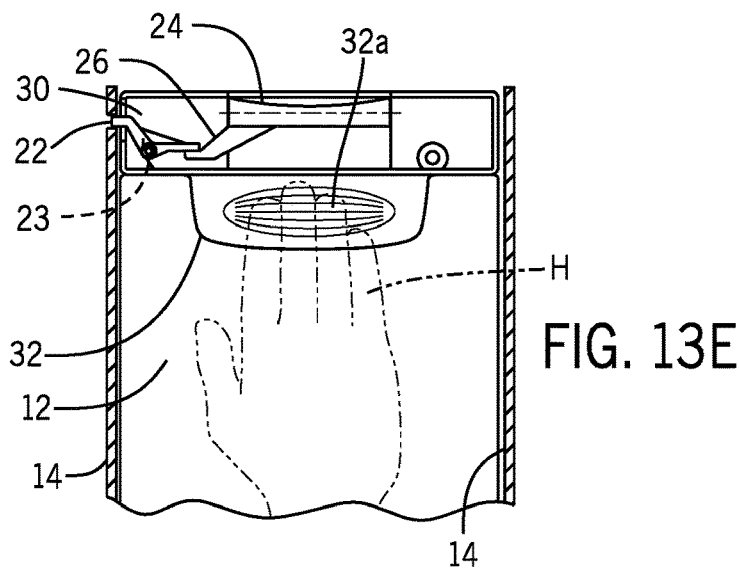

According to an exemplary embodiment as shown schematically in FIG. 9, interface 24 may be configured to rotate from a raised position as shown schematically in FIG. 11A to a depressed position as shown schematically in FIG. 11D to release cover 12 from base 11. Cover 12 may move in the opening direction as interface 24 rotates from the raised position toward the depressed position. Cam or pin 22 may be configured to rotate relative to base 11 to unlatch cover 12 from base 11 in response to rotation of interface 24. Spring 28 may be configured to bias interface 24 in the raised position and bias cam or pin 22 to latch cover 12 to base 11. Interface 24 may be configured to rotate from the raised position to the depressed position in response to an external force in the opening direction.

According to an exemplary embodiment as shown schematically in FIG. 9, interface 24 may be configured to disengage from cam or pin 22 to unlatch cover 12 from base 11; interface 24 may be configured to slide against cam or pin 22. The interface may be configured to rotate in response to an external force to disengage from cam or pin 22 to unlatch cover 12 from base 11. Spring 28 may be configured to bias interface 24 to engage cam or pin 22. Spring 26 may be configured to bias cam or pin 22 to unlatch cover 12 from base 11.

Figure 10A:
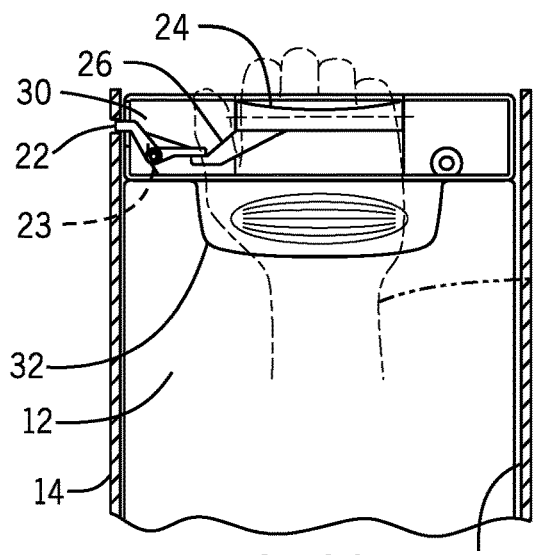
FIGS. 10A to 10E are schematic top partial views of the component with a cover moving from the closed position to the open position according to an exemplary embodiment.
Figure 10B:
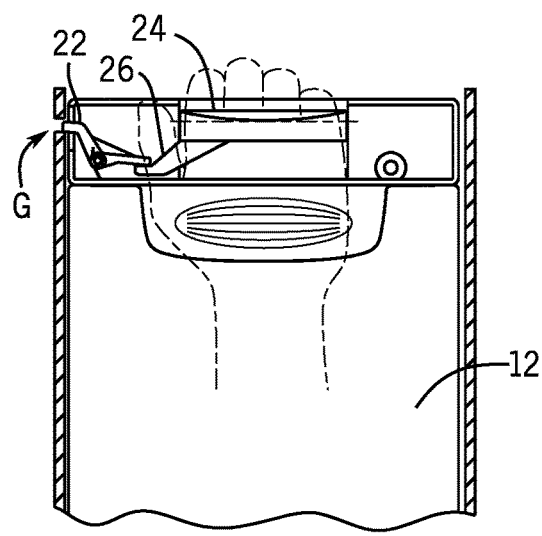
Figure 10C:
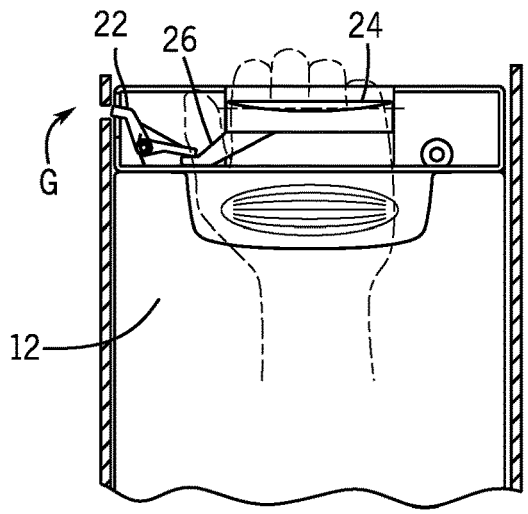
Figure 10D:
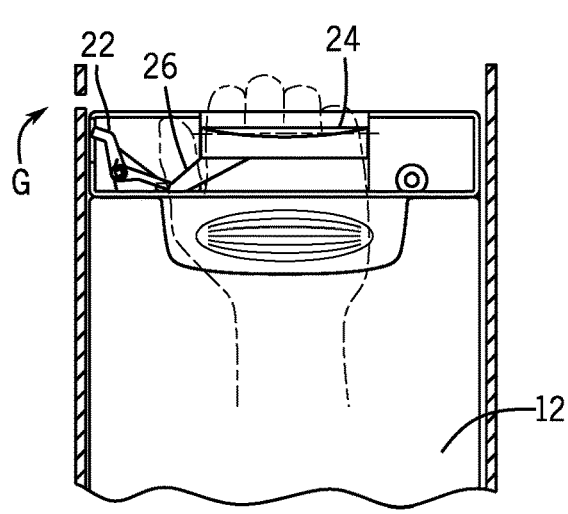
Figure 10E:
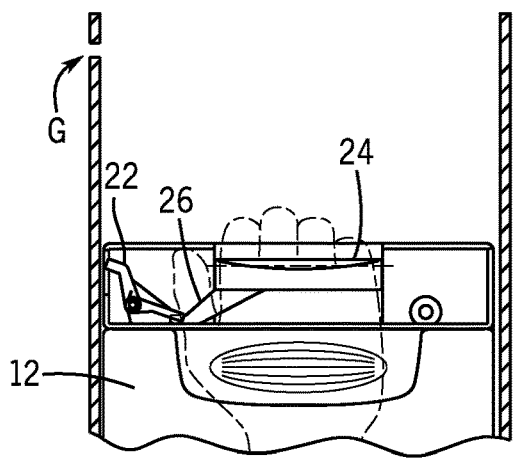

According to an exemplary embodiment as shown schematically in FIG. 10A, cam or pin 22 may be configured to retain cover 12 to base 11. Cam or pin 22 may be configured to rotate to unlatch cover 12 from base 11 as shown schematically in FIGS. 10B-10D. Arm 26 and spring 28 may be configured to bias arm 26 to move cam or pin 22 to latch cover 12 to base 11 as shown schematically in FIG. 10A. Cam or pin 22 may be configured to engage at least one of (a) an opening; (b) a recess; (c) a gap; (d) a hole G of base 11 to latch cover 12 to base 11 as shown schematically in FIG. 10A. Cam or pin 22 may be configured to unlatch cover 12 from base 11 in response to movement of interface 24 as shown schematically in FIGS. 10B-10D. Interface 24 may be configured to rotate from a raised position as shown schematically in FIG. 10A to a depressed position as shown schematically in FIGS. 10C and 10D to unlatch cover 12 from base 11. Spring 28 may be configured to bias interface 24 toward the raised position and bias cam or pin 22 to latch cover 12 to base 11 as shown schematically in FIG. 10A. Interface 24 may be configured to rotate from a raised position as shown schematically in FIG. 10A to a depressed position as shown schematically in FIGS. 10C and 10D to release cover 12 from base 11. Cover 12 may move in the opening direction as interface 24 rotates from the raised position toward the depressed position. Cam or pin 22 may be configured to rotate relative to base 11 to unlatch cover 12 from base 11 in response to rotation of interface 24 as shown schematically in FIGS. 10B and 10C. Spring 28 may be configured to bias interface 24 in the raised position and bias cam or pin 22 to latch cover 12 to base 11 as shown schematically in FIG. 10A. Interface 24 may be configured to rotate from the raised position to the depressed position in response to an external force in the opening direction as shown schematically in FIGS. 10B and 10C.

According to an exemplary embodiment as shown schematically in FIGS. 11A-11D, cam or pin 22 may be configured to rotate to unlatch cover 12 from base 11. Cam or pin 22 may be configured to unlatch cover 12 from base 11 in response to movement of interface 24. Interface 24 may be configured to rotate from a raised position as shown schematically in FIG. 11A to a depressed position as shown schematically in FIG. 11C to unlatch cover 12 from base 11. Spring 28 may be configured to bias interface 24 toward the raised position and bias cam or pin 22 to latch cover 12 to base 11 as shown schematically in FIG. 11A. Cover 12 may move in the opening direction as interface 24 rotates from the raised position toward the depressed position. Cam or pin 22 may be configured to rotate relative to base 11 to unlatch cover 12 from base 11 in response to rotation of interface 24. Spring 28 may be configured to bias interface 24 in the raised position and bias cam or pin 22 to latch cover 12 to base 11. The interface may be configured to rotate from the raised position to the depressed position in response to an external force in the opening direction. Interface 24 may be configured to disengage from cam or pin 22 as shown schematically in FIG. 11D to unlatch cover 12 from base 11; interface 24 may be configured to slide against cam or pin 22 as shown schematically in FIGS. 11A to 11C.

According to an exemplary embodiment as shown schematically in FIGS. 12A to 12F, hand H may actuate or depress interface 24; cover 12 may unlatch from the closed position; cover 12 may move relative to base 11 of component 10 towards the open position; bin 18 may be exposed when cover 12 is at the open position exposing a storage volume V.

According to an exemplary embodiment as shown schematically in FIGS. 13A-13E, cam or pin 22 may be configured to rotate to latch cover 12 to base 11. Arm 26 may be configured to rotate cam or pin 22 to latch cover 12 to base 11 as shown schematically in FIGS. 13C to 13E. Arm 26 and spring 28 may be configured to bias arm 26 to move cam or pin 22 to latch cover 12 to base 11. Cam or pin 22 may be configured to engage at least one of (a) an opening; (b) a recess; (c) a gap; (d) a hole of base 11 to latch cover 12 to base 11 as shown schematically in FIGS. 13D and 13E. Interface 24 may be configured to rotate from a depressed position as shown schematically in FIGS. 13A to 13C to a raised position as shown schematically in FIG. 13E to latch cover 12 to base 11. Spring 28 may be configured to bias interface 24 toward the raised position and bias cam or pin 22 to latch cover 12 to base 11.

Figure 14A:
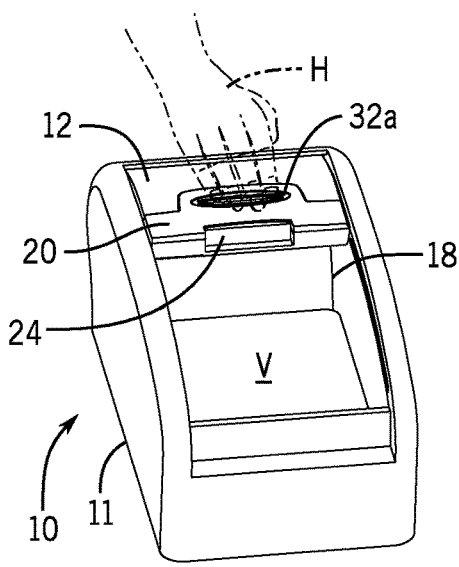
FIGS. 14A to 14F are schematic perspective views of the component with a cover moving from the open position to the closed position according to an exemplary embodiment.
Figure 14B:
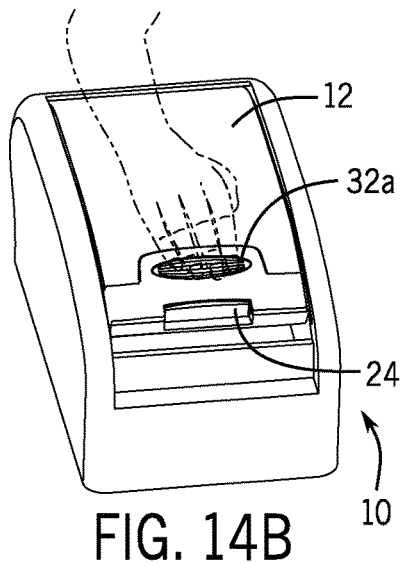
Figure 14C:
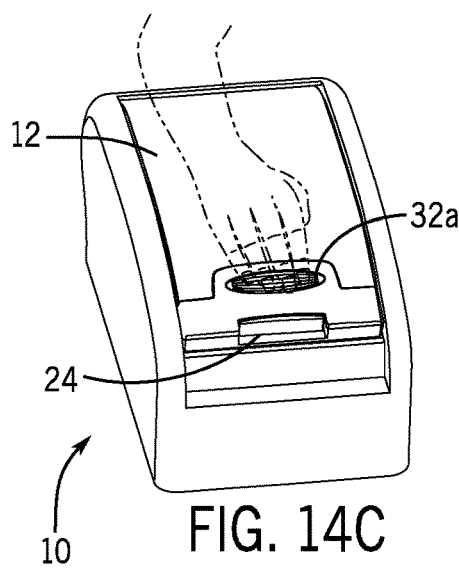
Figure 14D:
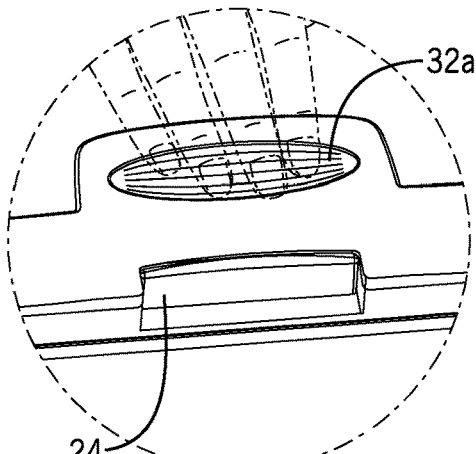
Figure 14E:
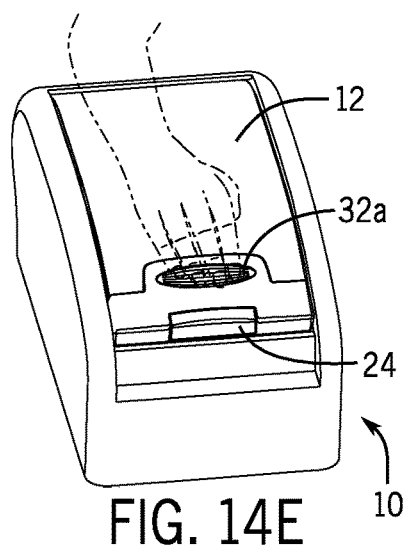
Figure 14F:
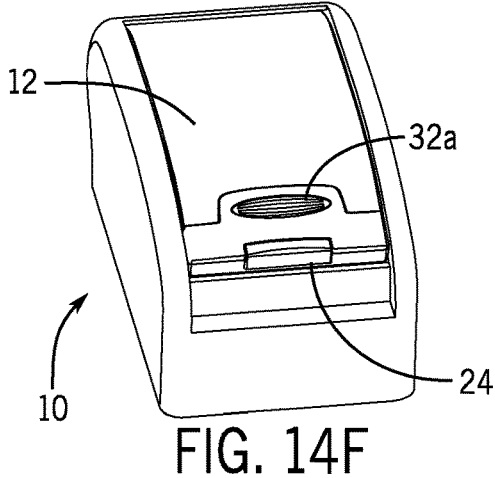
Figure 15A:
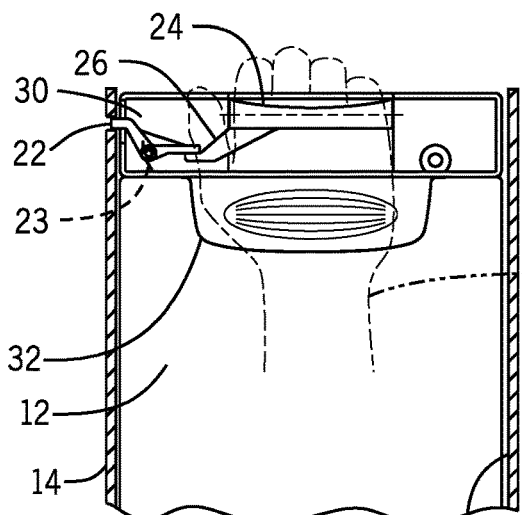
FIGS. 15A to 15E are schematic top partial views of the component with a cover moving from the closed position to the open position according to an exemplary embodiment.
Figure 15B:
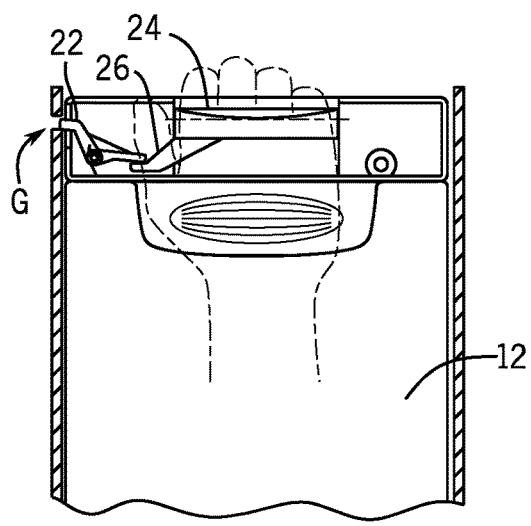
Figure 15C:
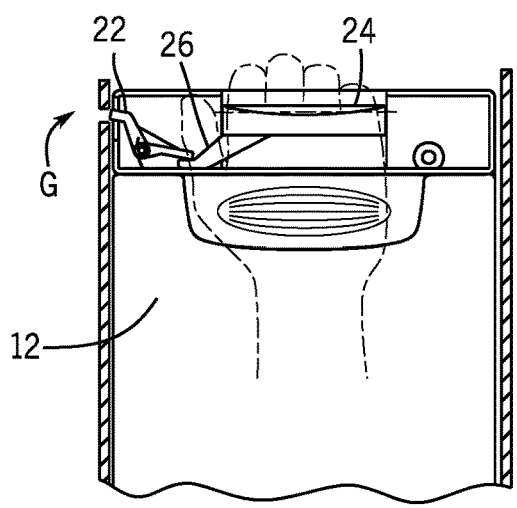
Figure 15D:
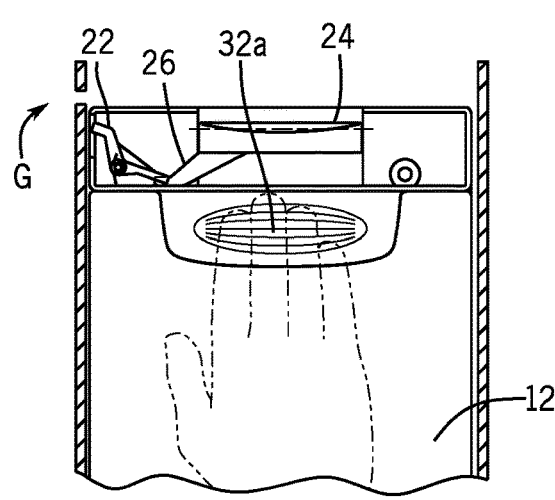
Figure 15E:
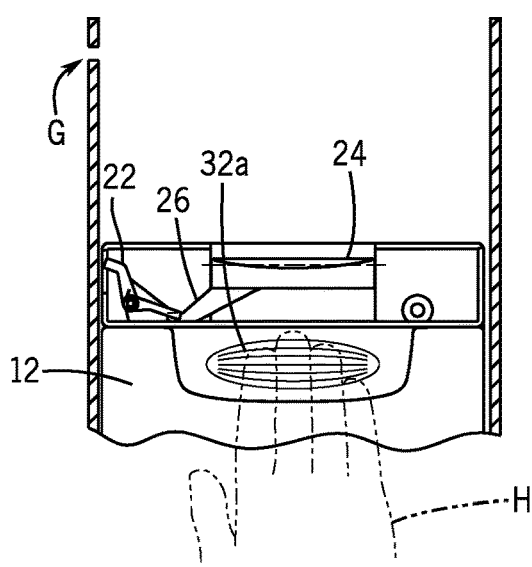
Figure 16A:
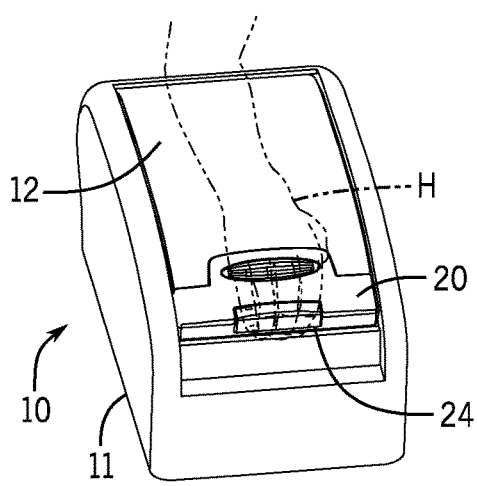
FIGS. 16A to 16E are schematic perspective views of the component with a cover moving from the closed position to the open position according to an exemplary embodiment.
Figure 16B:
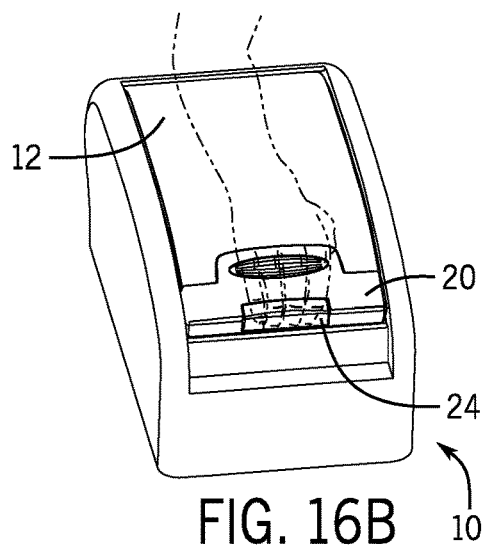
Figure 16C:
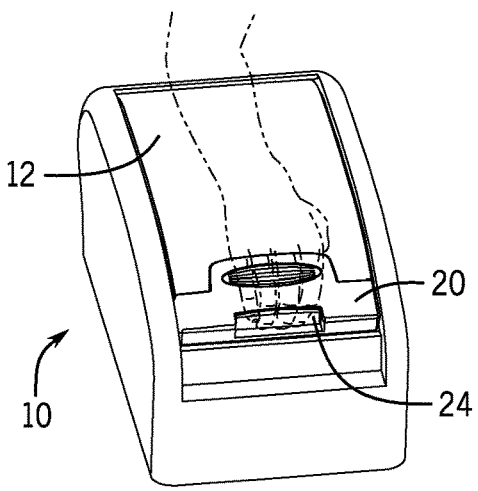
Figure 16D:
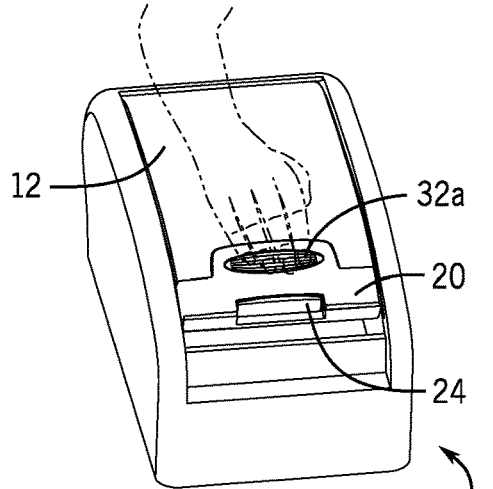
Figure 16E:
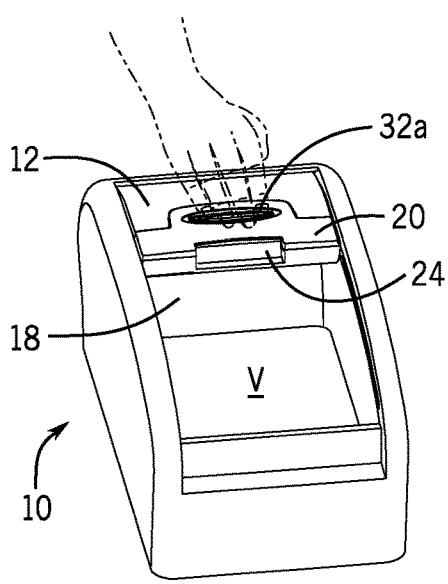

According to an exemplary embodiment as shown schematically in FIGS. 14A to 14F, hand H may engage with handle or depression 32a; cover 12 may move from the open position to the closed position; cover 12 may move relative to base 11 of component 10 towards the closed position; cover 12 may be latched at the closed position as shown schematically in FIG. 14F; bin 18 may be covered by cover 12 when cover 12 is at the closed position.

According to an exemplary embodiment as shown schematically in FIGS. 10A to 10E, 11A to 11D, 12A to 12F, 15A to 15E and 16A to 16E, cover 12 may be configured for translational fore/aft movement (e.g. by application of external force from a vehicle occupant) from the closed position covering bin 18 to the open position uncovering bin 18.

According to an exemplary embodiment as shown schematically in FIGS. 10A to 10E, a hand H may rotate and/or depress interface 24. As shown schematically in FIG. 10A, cover 12 is at the closed position; cam or pin 22 is engaged in an opening, recess, hole or gap G on side rail 14 (i.e. at the extended position) to latch cover 12 to base 11. As shown schematically in FIG. 10A, arm 26 and spring 28 of mechanism 20 may be configured to bias interface 24 in the raised/default position; external force applied to interface 24 may overcome spring 28 to move arm 26 to disengage from cam 22; disengagement of arm 26 and pin or cam 22 may rotate pin or cam 22 to unlatch cover 12 from base 11. According to an exemplary embodiment, as interface 24 moves (e.g. is actuated) from the raised position to the depressed position, arm 26 may move to allow cam or pin 22 to rotate in response to actuation of spring 23 to unlatch cover 12 from base 11. Rotation of cam or pin 22 may disengage cam or pin 22 from gap G (i.e. at the engaged position) via a linkage formed between interface 24, arm 26 and cam or pin 22. As shown schematically in FIGS. 10D and 10E, mechanism 20 is out of engagement from gap G; cam or pin 22 is in a rotated position; side rail 14 may be configured to prevent movement of cam or pin 22 to prevent movement of interface 24.

According to an exemplary embodiment as shown schematically in FIGS. 11A to 11D, mechanism 20 is shown moving from a latched position to an unlatched position. As shown schematically in FIGS. 11A to 11D, mechanism 20 may comprise arm 26, cam or pin 22 and spring 28. As shown schematically in FIG. 11A, arm 26 is in an upper position (e.g. cover 12 is in the closed and latched position and interface 24 has not been depressed); in this position an end of arm 26 may engage and restrain an end of cam or pin 22 with a second end of cam or pin 22 being engaged within gap G of base 11. As shown schematically in FIGS. 11B and 11C, arm 26 may be moved by external force depressing interface 24; spring 28 may compress; movement of arm 26 may allow arm 26 to disengage from cam or pin 22; spring 23 may push cam or pin 22 and cam or pin 22 may rotate to disengage from gap G of base 11 and to unlatch cover 12 from base 11.

According to an exemplary embodiment as shown schematically in FIG. 11D, arm 26 is disengaged from cam or pin 22 and cam or pin has rotated; cam or pin 22 is fully disengaged from gap G along side rail 14 of base 11 and cover 12 is unlatched from base 11 and free to move in an opening direction to uncover bin 18.

According to an exemplary embodiment as shown schematically in FIGS. 15A to 15E and 16A to 16E, after cam or pin 22 is disengaged from the latched/engaged position, cam or pin 22 may be held or retained in the unlatched/rotated position by side rail 14; hand H may move cover 12 toward the open position by engaging any part of cover 12 accessible to the vehicle occupant (e.g. handle or depression 32a, etc.).

According to an exemplary embodiment as shown schematically in FIGS. 13A to 13E and 14A to 14F, cover 12 may be configured for movement (e.g. by external force) from the open position to the closed position.

According to an exemplary embodiment as shown schematically in FIGS. 13A to 13E, hand H is shown engaging handle or depression 32a to slide cover 12 towards the closed position. As shown schematically in FIG. 13A, cover 12 is at the open position. As shown schematically in FIGS. 13A and 13B, mechanism 20 is out of engagement from gap G; cam or pin 22 is in the rotated position; side rail 14 holds cam or pin 22 in the rotated position. As shown schematically in FIGS. 13C to 13E according to an exemplary embodiment, as interface 24 moves from the depressed position to the raised position (by spring 28), cam or pin 22 engages with gap G (i.e. towards the engaged position) via movement of arm 26 under force from spring 28. As shown schematically in FIG. 13E, cam or pin 22 is engaged in the corresponding gap G of side rail 14 (i.e. in the engaged position) to lock or latch cover 12 in the closed position.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior configured to be operated by application of an external force from an occupant comprising:
   (a) a base comprising a bin;
   (b) a cover configured to move in an opening direction to uncover the bin and move in a closing direction to cover the bin; and
   (c) a mechanism configured to retain the cover to the base; wherein the mechanism comprises a cam configured to retain the cover to the base;
   wherein the cam is configured to rotate (a) to latch the cover to the base and (b) to unlatch the cover from the base.

2. The component of claim 1 wherein the mechanism comprises a pin configured to move from an aperture to unlatch the cover from the base as the cover is moved in the opening direction to uncover the bin.

3. The component of claim 1 wherein the mechanism comprises an arm configured to rotate the cam to latch the cover to the base.

4. The component of claim 1 wherein the mechanism comprises an arm and a spring configured to bias the arm to move the cam to latch the cover to the base.

5. The component of claim 1 wherein the base comprises at least one of (a) an opening; (b) a recess; (c) a gap; (d) a hole configured to latch the cover to the base; and wherein the cam is configured to engage the at least one of (a) the opening; (b) the recess; (c) the gap; (d) the hole to latch the cover to the base.

6. The component of claim 1 wherein the mechanism comprises a spring configured to bias the cam to unlatch the cover from the base.

7. The component of claim 1 wherein the mechanism comprises an interface; wherein the cam is configured to unlatch the cover from the base in response to movement of the interface.

8. The component of claim 1 wherein the mechanism comprises an interface configured to rotate from a raised position to a depressed position to unlatch the cover from the base.

9. The component of claim 8 wherein the mechanism comprises a spring configured to (a) bias the interface toward the raised position and (b) bias the cam to latch the cover to the base.

10. The component of claim 1 wherein the cover comprises at least one of (a) a tambour door; (b) a semi-rigid sheet; (c) a flexible sheet; (d) plastic; (e) cloth, (f) a door.

11. A component for a vehicle interior configured to be operated by application of an external force from an occupant comprising:
(a) a base comprising a bin;
(b) a cover configured to move in an opening direction to uncover the bin and move in a closing direction to cover the bin; and
(c) a mechanism configured to retain the cover to the base; wherein the mechanism comprises a button configured to rotate from a raised position to a depressed position to release the cover from the base.

12. The component of claim 11 wherein the cover is configured to move in the opening direction as the button rotates from the raised position toward the depressed position.

13. The component of claim 11 wherein the mechanism comprises a pin configured to rotate relative to the base to unlatch the cover from the base in response to rotation of the button.

14. The component of claim 13 wherein the mechanism comprises a spring configured (a) to bias the button in the raised position and (b) to bias the pin to latch the cover to the base.

15. The component of claim 11 wherein the button is configured to rotate from the raised position to the depressed position in response to the external force in the opening direction.

16. A component for a vehicle interior configured to be operated by application of an external force from an occupant comprising:
(a) a base comprising a bin;
(b) a cover configured to move in an opening direction to uncover the bin and move in a closing direction to cover the bin; and
(c) a mechanism configured to retain the cover to the base; wherein the mechanism comprises an interface and a pin; wherein the interface is configured to disengage from the pin to unlatch the cover from the base; wherein the mechanism comprises a spring configured to bias the pin to unlatch the cover from the base.

17. The component of claim 16 wherein the interface is configured to slide against the pin.

18. The component of claim 16 wherein the interface is configured to rotate in response to the external force to disengage from the pin to unlatch the cover from the base.

19. The component of claim 16 wherein the mechanism comprises a spring configured to bias the interface to engage the pin.

20. The component of claim 16 wherein the mechanism is configured so that (a) the pin is moved from an aperture to unlatch the cover from the base as the cover is moved in the opening direction to uncover the bin and (b) the pin is moved into the aperture to latch the cover to the base as the cover is moved toward the closing direction to cover the base.

* * * * *